United States Patent [19]

Castaigne et al.

[11] 4,094,235

[45] June 13, 1978

[54] APPARATUS FOR THE PRODUCTION OF TEXTURED PRODUCTS

[75] Inventors: Francois Castaigne, Cap Rouge; Marcel Boulet, Ste-Foy; Rene R. Riel, Ste-Foy; Eric Liber, Ste-Foy, all of Canada

[73] Assignee: Universite Laval, Sainte-Foy, Canada

[21] Appl. No.: 493,455

[22] Filed: Jul. 31, 1974

[51] Int. Cl.² .............................................. A23J 3/00
[52] U.S. Cl. .................................. 99/450.1; 99/516; 366/292; 426/802
[58] Field of Search ..................... 99/484, 516, 534; 426/276, 452, 516, 517, 802; 264/190, 202; 259/6, 4 R, 64

[56] References Cited

U.S. PATENT DOCUMENTS

| | | | |
|---|---|---|---|
| 2,682,466 | 6/1954 | Boyer | 426/516 X |
| 3,794,737 | 2/1974 | Dannert | 426/276 |
| 3,864,502 | 2/1975 | Sakita | 426/276 X |
| 3,889,010 | 6/1975 | Brouwer | 426/276 |

Primary Examiner—Harvey C. Hornsby
Assistant Examiner—Timothy F. Simone
Attorney, Agent, or Firm—Bacon & Thomas

[57] ABSTRACT

This invention relates to an apparatus for producing textured products which comprises means for producing a dispersion of raw products, means forming filaments from the dispersion, means establishing a fluid medium, means for feeding the filaments into the fluid medium, and means for coagulating the filaments. Given $\Delta v$, the difference between the speed at which the fluid medium travels and the speed at which the filaments are introduced into the fluid medium, the apparatus can be adjusted in the following manner:

$$\Delta v < 0,$$

product: cotton-like bundle of cut-up filaments;

$$\Delta v = 0,$$

product: filament with large cross-section and undulated outer surface;

$$\Delta v > 0,$$

product: thread-like continuous filament with small cross-section.

1 Claim, 12 Drawing Figures

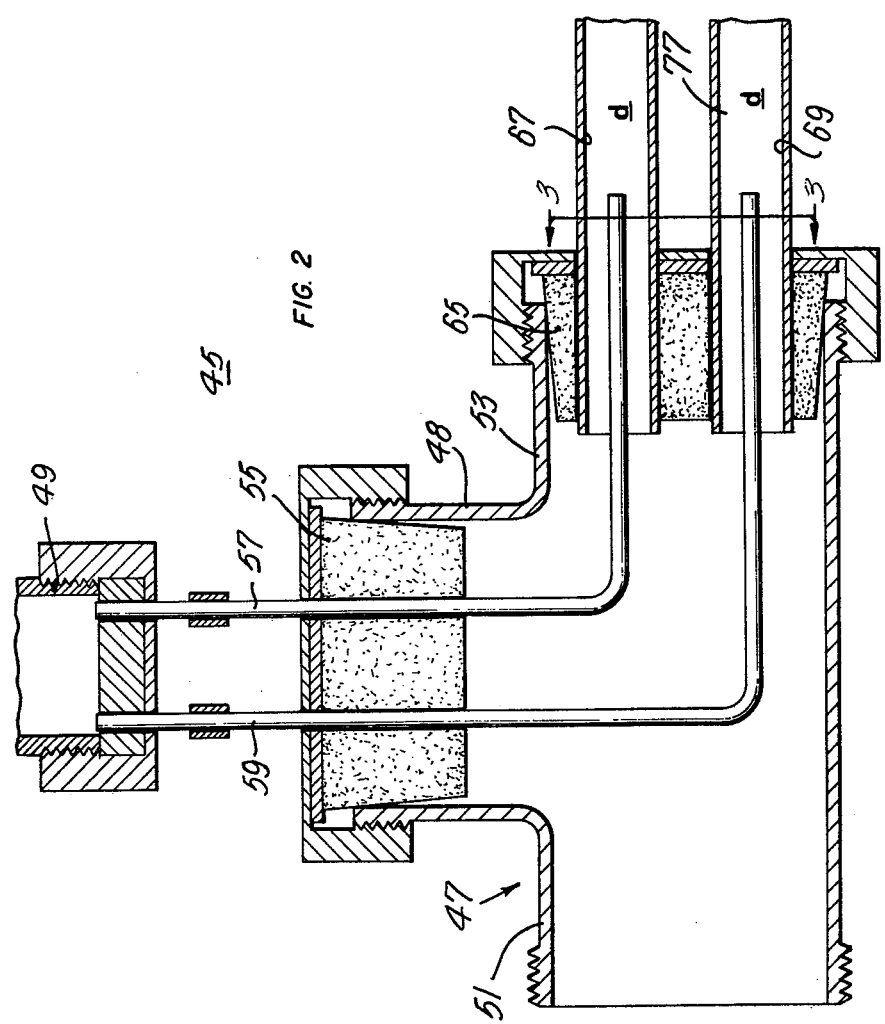

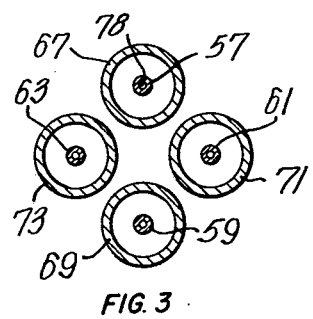
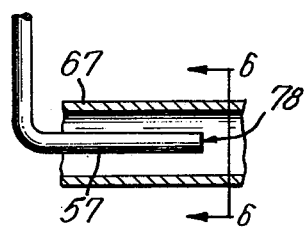
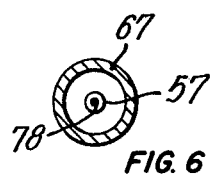
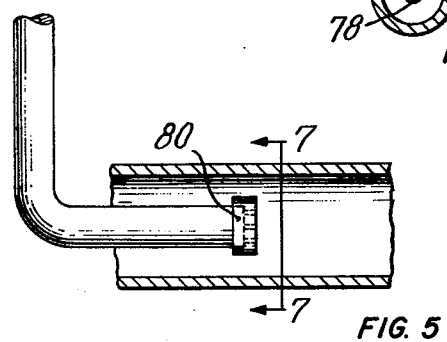
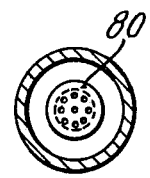
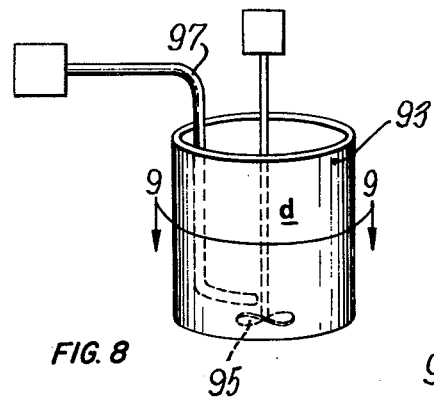
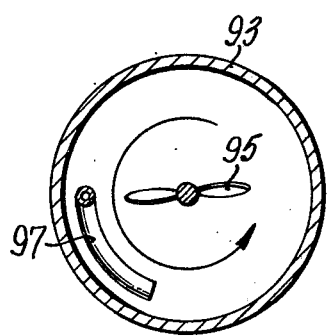
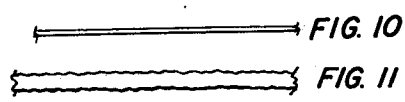
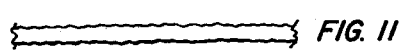

APPARATUS FOR THE PRODUCTION OF TEXTURED PRODUCTS

BACKGROUND OF THE INVENTION

1. Field of the Invention

This invention is directed to an apparatus for producing textured products. More particulaly, the present invention relates to an apparatus for producing fibers or filaments of protein products which have a fibrous or crispy texture. Examples of protein products having a fibrous texture include foods which are intended to be used as substitutes for meats; and examples of protein products having a crispy texture include foods which serve as substitutes for breakfast cereals.

2. Description of the Prior Art

In copending application Ser. No. 481,853, filed June 21, 1974 and entitled "PROCESS FOR THE PRODUCTION OF TEXTURED PRODUCTS", there is described a process by means of which it is possible to obtain textured products, more particularly, textured protein products, which can very well be used as substitutes for meat or other foods. This process basically establishes that in order to obtain a good orientation of the molecules in the finished textured product while at the same time making the process trouble free and economical, the filaments produced from the raw products are treated in a fluid medium which travels at a speed which is lower, equal or higher than the speed of the continuous filaments as they exit from a spinneret, tube or the like.

According to Robert Boyer, in U.S. Pat. No. 2,682,466, dated June 29, 1954, the filaments are oriented by means of a series of rollers which exert a traction on the filaments due to the fact that the filaments are picked up by the rollers and that the rollers rotate at increasing speed relative to one another. This apparatus can be used only for obtaining a mechanical drawing of the filaments. However, the process which uses rollers for drawing the fibers is quite sophisticated. On the other hand, there is a definite possibility of breaking the filaments which may cause all sorts of problems. It is therefore an object of the present invention to provide an apparatus which will enable the drawing of the filaments or fibers to be carried out in a fluid medium, without running the risk of breaking the filaments, while at the same time making sure that the process is economical.

SUMMARY OF THE INVENTION

This invention relates to an apparatus for producing textured products which comprises:
(a) means for producing a dispersion of raw products,
(b) means forming filaments from said dispersion of raw products,
(c) means establishing a fluid medium,
(d) means for feeding said filaments into said fluid medium, and
(e) means for coagulating said filaments.

BRIEF DESCRIPTION OF THE DRAWINGS

In the drawings which illustrate the invention,

FIG. 2 is a large scale view of the spinning unit;

FIG. 3 is a section taken along a line 3—3 of FIG. 2;

FIG. 4 is a longitudinal view of a spinning tube associated with a coagulating tube;

FIG. 5 is a longitudinal view of another spinning tube also associated with a coagulating tube;

FIG. 6 is a section taken along a line 6—6 of FIG. 4;

FIG. 7 is a section taken along a line 7—7 of FIG. 5;

FIG. 8 is a view of a modified unit for producing and drawing filaments;

FIG. 9 is a view from above of the unit illustrated in FIG. 8;

FIG. 10 is a view of a filament produced when the apparatus is operating a $\Delta v > 0$;

FIG. 11 is a view of a filament produced when the apparatus is operating at $\Delta v = 0$; and FIG. 12 is a view of a filament produces when the apparatus is operating at $\Delta v > 0$.

DESCRIPTION OF THE PREFERRED EMBODIMENTS

Figure 1:
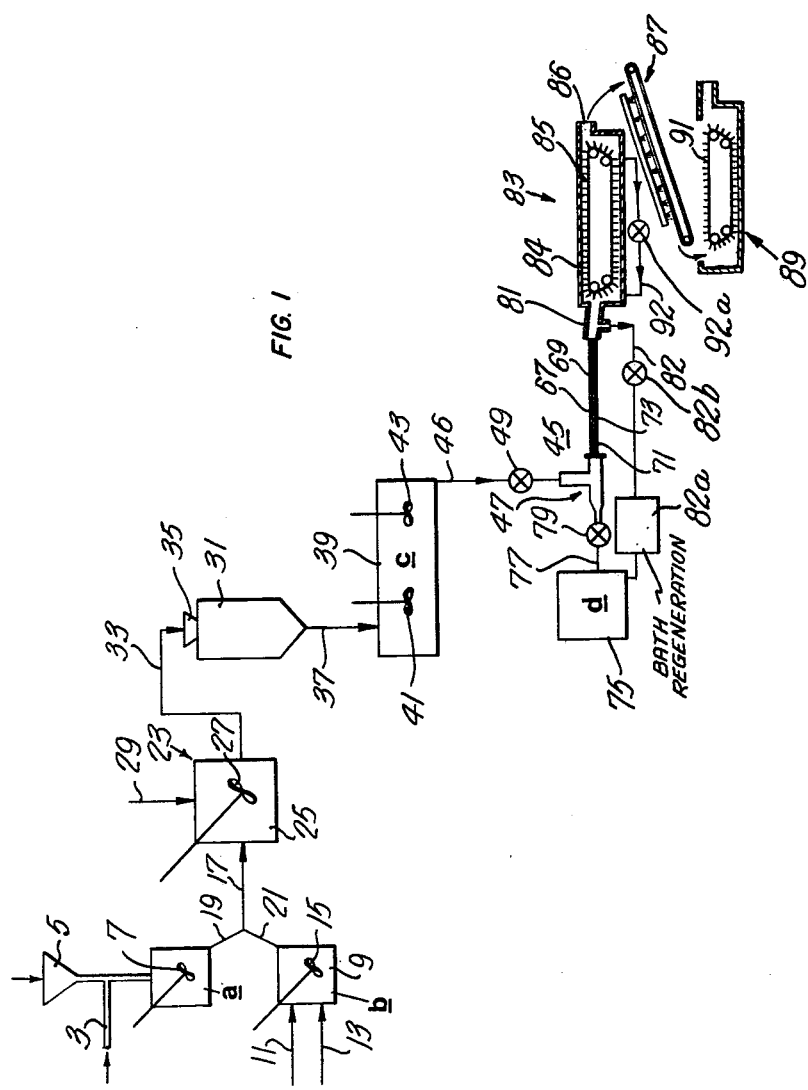
FIG. 1 is a diagram of a unit for producing textured proteins according to the invention.

Referring to the drawings, more particularly, FIGS. 1 to 7, the device illustrated comprises inter alia a tank 1 to which are connected feed ducts 3 and 5 for respectively introducing into the tank 1, water at 100° C and sodium alginate. As shown in FIG. 1, the feed duct 5 is in the form of a dispensing funnel. The tank 1 also comprises a stirrer 7 by means of which it will be possible to thoroughly mix the hot water and the alginate in order to obtain a good dispersion of sodium alginate $a$ in water. It should be noted that the combination of dispensing funnel 5 and stirrer 7 is well known in the art.

The device also comprises another tank 9 which is similar to tank 1 and to which are connected feed ducts 11 and 13 which will enable to respectively introduce water at 40° C and proteins into the tank 9. As in the case of tank 1, the tank 9 is provided with a stirrer 15 by means of which it will be possible to mix the water at 40° C and proteins in order to obtain a good dispersion of proteins $b$ in water. The tanks 1 and 9 are in turn connected to a main feed duct 17 by means of exit lines 19 and 21. The main feed duct 17 will serve to feed a mixture of sodium alginate dispersion $a$ and proteins dispersion $b$ into the mixing unit 23.

The mixing unit 23 will be seen to consist of a tank 25 which is somewhat associated with a pump (not shown) and a stirrer 27 all of which will contribute in the thorough mixing of the two solutions $a$ and $b$ originating both in tanks 1 and 9. The unit 23 also comprises an inlet line 29 which will be used for introducing coloring matter such as caramel, beet extract, etc. and various flavoring agents into the solutions.

The apparatus also comprises a colloid mill or disintegrator 31 which is connected to the unit 23 by means of duct 33. The latter is used to first feed the mixture obtained in mixing unit 23 into a funnel 35 after which the mixture is introduced into the disintegrator or colloid mill 31 to be treated therein and to form a homogenized spinning dope $c$. This type of machine is well known in the art and for practical purposes, one can use the one which is known and sold under the trademark "COMITROL". At the lower end of the disintegrator 31, there is another duct 37 which will be used to carry the spinning dope $c$ obtained in the disintegrator 31 into ballast tank 39. This tank 39 is what could be called a storage unit which is used to receive the spinning dope from the disintegrator 31 via duct 37, and to store large quantities of the same, ready to be used in the succeeding parts of the apparatus. In order to maintain a good homogeneity of spinning dope $c$ in the ballast tank 39, there are provided a pair of stirrers 41 and 43 which of course operate in known manner.

The spinning dope c is now ready to be converted into filaments and this will be carried out in the spinning unit 45 which we will now describe. It will be realized that the spinning unit has only been illustrated schematically in FIG. 1 and for a better illustration of this portion of the apparatus, reference is made to FIGS. 2 through 7 of the drawings.

The spinning unit 45 is connected to the ballast tank 39 by means of duct 46 which also includes a pump 49. It will be realized that the presence of the pump 49 is required for the purpose of always keeping the spinning dope under pressure in the spinning unit. The spinning unit 45 generally comprises an inverted T-shaped tubular member 47 (FIG. 2) which has an upward portion 48 and two lateral portions 51 and 53. The upward portion 48 of the tubular member 47 is closed by a stopper 55 through which extend spinning tubes 57, 59, 61 and 63. It will be realized that spinning tubes 61 and 63 have only been illustrated in FIG. 3 of the drawings and that they have been cut off from FIG. 2 for the purpose of clarity. It is of course understood that any number of tubes can be used depending on circumstances and the dimensions of the tubes and of the stopper 55.

The spinning tubes 57, 59, 61, 63 will therefore connect the pump 49 to the spinning unit 45, more precisely, to tubular member 47.

Each spinning tube 57, 59, 61, 63 is bent inside the tubular member 47 to be directed toward the portion 53 of the tubular member 47.

The portion 53 is closed by a sealing stopper 65 through which extend as many coagulation tubes as there are spinning tubes. In the present case, we will have coagulation tubes 67, 69, 71, 73. The coagulation tubes 67, 69, 71, 73 must have a much larger inside diameter than the outside diameter of the corresponding spinning tubes 57, 59, 61, 63. For example, we may have spinning tubes having an outside diameter of 2.6 mm. while the inside diameter of the coagulation tubes is 1.5 cm. These measurements are of course subject to variation it being understood that their respective dimensions will be adjusted according to the types of proteins that are spun and the amount of drawing required.

As illustrated, each spinning tube enters a corresponding coagulation tube in such a way that after the filaments are forced out of the spinning tube, they will be taken over by the drawing and coagulating fluid d.

The drawing and coagulating fluid d is contained in reservoir 75 which is in communication with the tubular member 47 via duct 77 and pump 79. It should be remembered that the pump 79 will be adjusted to pick up the coagulating liquid d, from the coagulating reservoir 75 and to introduce it into the portion 51 of the tubular member 47. The coagulating liquid d will thereafter enter all the coagulating tubes 67, 69, 71 and 73 to form a picking stream 77 in each coagulating tube, which stream will pick up the filaments at the outlet of the spinneret which is provided at the end of each spinning tube.

It should be remembered that the pump 79 will operate to produce a stream 77 which can be moved at various relative speeds with respect to the speed at which the filaments are delivered into the stream 77. For example, if the speed of the moving stream is lower than the speed of the filaments being delivered into the stream 77, the product will look like absorbent cotton wherein the filament has a very small cross-section and is all intermingled and cut up, as shown in FIG. 12. If on the other hand, the velocity of the picking stream is the same as the speed of the filaments, this should produce a continuous filament with a good cross-section and an undulated outside surface as shown in FIG. 11 of the drawings. Finally, if the speed of the moving stream is higher than the speed of the filaments, the net result will be a well defined thread-like filament as shown in FIG. 10.

To summarize, given $\Delta v$, the difference between the speed at which the picking stream travels and the speed at which the filament is injected into that stream, one can have the three following possibilities:

$$\Delta v < 0$$

cotton-like bundle of cut-up filaments (FIG. 12);

$$\Delta v = 0$$

filament with large cross-section and undulated outer surfce (FIG. 11);

$$\Delta v > 0$$

thread-like continuous filament with small cross-section (FIG. 10).

Turning now to the spinneret and with particular reference to FIGS. 4 and 5, it will be realized that the spinneret can either consist of the outlet end 78 of the spinning tube itself or can also be made of a standard multi-holes spinneret 80. In practice, it may be more useful to use a spinneret of the type illustrated in FIG. 5, for it is less costly per single filament and takes less space in the spinning unit.

The coagulating and drawing tubes 67, 69, 71, 73 extend a certain distance outside the tubular member 47 after which they are connected to a fiber slowing table 81 which has a somewhat flared shape. Coming back to the coagulating tubes 67, 69, 71, 73, it should be pointed out that the diameter of the tubes and the flow from the pump 79 are such that the speed of the coagulating stream inside the coagulating tubes 67, 69, 71, 73 is lower or at least equal to and even higher than the speed at which the jets of spinning dope exit from the spinneret.

The length of the coagulating tubes is also important and sould be made dependent on the amount of coagulation necessary to give a self-supporting fiber and to give the desired amount of stretching to the fiber.

The length of the coagulating tubes should also depend on the time of coagulation. It must also be remembered that the diameter of the fiber and the physical characteristics of the spinning dope are directly related to the coagulating time (viscosity, aeration, etc.).

It will be seen that upon coagulation the jet of spinning dope is solidified and thereafter becomes a fiber. The time of residence of the fiber in the coagulating tube should be sufficiently long to enable it to keep its shape.

It should be noted that the friction of the liquid bath against the fiber increases with the length of the coagulating tube. The tube should be sufficiently long to give the desired amount of stretching to the fiber.

Following the slowing down system 81, there is a further coagulation unit 83 to finalize the coagulation of the fiber, the unit 83 incorporating a conveyor 85 which is used for further carrying the fibers. A portion of the liquid passing through the slowing down system 81 is recirculated to reservoir 75 via duct 82, along which there is provided a bath regeneration unit 82a and a pump 82b. Bath regeneration unit 82b will be used for monitoring and regenerating acids and salts in the coagulating bath.

At the exit 86 of the coagulation unit 83 there is a downward prewashing conveyor 87 which is followed by a final washing bath 89 which also includes a conveyor 91. A recirculating duct 92 along which a pump 92a is mounted connects both ends of the coagulation unit 83, all in the manner illustrated in FIG. 1 of the drawings.

In accordance with another embodiment of the invention, which is illustrated in FIGS. 8 and 9 of the drawings, the coagulating bath $d$ will be contained in a cylindrical container 93 in which there is provided an axially mounted stirrer 95 for inducing a rotary motion to the coagulating bath $d$. The spinning tube 97 is inside the container and as shown in the drawings is constructed and arranged to produce a continuous filament which tangentially hits the coagulating bath in motion as illustrated in FIG. 9 of the drawings.

If the apparatus is to be operated using ingredients such as proteins, homogenizing agents, coloring matter, flavoring ingredients, such as onions, beef, chicken, fish, other seafoods, etc., the first step includes the dissolving of the alginates which can also be a mixture of various gums depending on the properties such as viscosity, etc., which one wishes to obtain in the spinning solution. These properties are mainly aimed at obtaining a solution which can easily coagulate and form fibers in which firmness is easy to control.

Dissolving of the alginates is carried out in tank 1 with the aid of the combination mixing funnel and stirrer 5, 7. At the same time, proteins of various sources, such as soya, colza, wheat gluten, corn, cotton, kidney beans, milk, etc., are hydrated in water which is heated between 40° and 100° C in order to produce a solution which is homogeneous and has no lumps in it. This is carried out in tank 9. It is also possible to add in tank 9 small amounts of sodium metabisulphite, such as 0.1%. After the two solutions have been prepared respectively in tanks 1 and 9, they are thereafter mixed together in the mixing unit 23. At this point, the coloring matter, such as caramel, beet extract, and the various flavoring agents, are added.

From then on, the combined solution is passed into the disintegrator 31 which will be used to complete the dispersion. The mixture obtained consists of an aerated spinning dope $c$, which has a viscosity varying between 5000 and 50,000 centipoises, and which is stored in ballast tank 39 while stirring in order to prevent the formation of lumps. Although this has not been shown in the drawings, it is possible to mount a unit for deaerating the paste. This unit will be mounted on ballast tank 39.

The next step comprises the coagulation, drawing and washing of the fibers and it would seem to be quite important in order to obtain the desired final texture in the product.

Coagulation is carried out in bath $d$ which contains an acid and a salt, said bath being in movement and having a pH between 1 and 4. In the case illustrated in FIG. 1, the coagulating bath is circulated from the container 75 into the spinning unit 45. In the embodiment illustrated in FIGS. 8 and 9, the bath is induced into rotation and the filaments are injected into the bath at a speed less than the rotation speed of the bath which itself will make sure that the filaments will be drawn. As we have indicated above, the spinning unit 45 consists of a tubular T-shaped member in which the spinning tubes are inserted and in which the coagulating bath $d$ flows. The spinnerets are all of the same length and of the same inner diameter in order that the spinning dope exit at the same speed from each of the spinning tubes.

In the drawings, we have shown four spinning tubes. It is obvious that this number can be decreased or increased depending on the product desired. Many systems of injecting the spinning dope can be combined such that the same solution is fed into them. The pump 49 which pushes the mixture of protein and alginate into the spinning tubes is preferably of the positive action type such as a Waukesha pump. The pump must be able to deliver a pressure of the order of 75 to 500 pounds per square inch.

As shown in the drawings, the coagulating bath enters the member 47 in portion 51 thereof. Obviously, the jets which are produced by the spinnerets and the coagulating solution circulate inside the apparatus in the same direction in parallel relationship to one another.

After the filaments have been formed and coagulation has been initiated in the coagulation tubes, the fibers are slowed down in slowing down unit 81. This is for the purpose of preventing the fibers from being crushed in the final coagulation unit 83. In addition, the slowing down of the fibers enables to obtain a good distribution of the fibers before they enter the final coagulation unit 83. The latter will be seen to consist of a coagulation tank 84 and a conveyor 85 which is movable in the coagulation tank 84.

The final step includes prewashing at 87 and a final washing at 89. Unit 87 includes a sloping table with pressure water jets for washing fibers.

Final washing is carried out in unit 89 which has a tank 90 and a conveyor 91 to move the filaments in the bath $f$.

We claim:

1. Apparatus for producing protein fibers which comprises
   (a) a first mixer for producing a dispersion of sodium alginate,
   (b) a second mixture for producing a dispersion of proteins,
   (c) a third mixer for mixing the two dispersions obtained in (a) and (b),
   (d) ducts to feed said two dispersions into said third mixer,
   (e) a disintegrator for homogenizing said two dispersions and for breaking off small lumps therein, and a duct to connect said third mixer to said disintegrator,
   (f) a ballast tank to receive homogenized dispersion from said disintegrator and a duct to connect said ballast tank to said disintegrator,
   (g) a pump connected to said ballast tank by means of a duct,
   (h) at least one spinning tube leading away from said pump, and a spinneret at the end of said spinning tube,
   (i) a T-shaped tubular member provided with a first, a second, and a third opening, said spinning tube extending through the first opening inside the T-shaped tubular member and thereafter bending towards the second opening of said T-shaped tubular member,
   (j) said second opening being provided with a coagulating tube for each spinning tube, the end of said spinning tube with said spinneret inserted inside said coagulating tube, (k) a tank to contain a coagulation liquid and a duct and pump assembly to feed said coagulating liquid through said third opening into said T-shaped tubular member, (l) a slowing down unit to receive filaments which have been precoagulated and picked up in said coagulating tubes, said slowing down unit to prevent crushing of the filaments in the next unit, (m) said next unit comprising a coagulation bath and a conveyor in said coagulation bath for moving the filaments along therein and providing a final coagulation thereof, and (n) a duct to recirculate the coagulating bath in said tank defined in (k) and means along said duct for monitoring and regenerating acids and salts in said coagulating bath.

* * * * *

UNITED STATES PATENT OFFICE
CERTIFICATE OF CORRECTION

Patent No. 4,094,235      Dated June 13, 1978

Inventor(s) FRANCOIS CASTAIGNE ET AL

It is certified that error appears in the above-identified patent and that said Letters Patent are hereby corrected as shown below:

Claim 1, line 43, cancel "mixture" and insert --mixer--.

Signed and Sealed this

Twenty-second Day of May 1979

[SEAL]

Attest:

RUTH C. MASON
Attesting Officer

DONALD W. BANNER
Commissioner of Patents and Trademarks